United States Patent [19]

Pickles

[11] 4,324,502
[45] Apr. 13, 1982

[54] LOCKING MECHANISM FOR TELESCOPIC TUBING

[75] Inventor: Robert A. Pickles, Beacon, N.Y.

[73] Assignee: Texaco, Inc., White Plains, N.Y.

[21] Appl. No.: 108,870

[22] Filed: Dec. 31, 1979

[51] Int. Cl.³ .............................................. F16B 7/14
[52] U.S. Cl. .................................... 403/104; 403/351
[58] Field of Search ............... 403/104, DIG. 7, 351, 403/350, 372; 285/DIG. 19

[56] References Cited

U.S. PATENT DOCUMENTS

| | | | |
|---|---|---|---|
| 958,752 | 5/1910 | Mackensey | 285/302 |
| 2,261,505 | 11/1941 | Schlesinger | 285/298 X |
| 2,490,368 | 12/1949 | Neuwirth | 248/188.5 |
| 2,517,700 | 8/1950 | Odin | 403/351 |
| 2,526,415 | 10/1950 | Refsdal | 403/351 |
| 3,771,785 | 11/1973 | Speyer | 403/104 |
| 3,963,360 | 6/1976 | Fedrigo | 403/351 X |

Primary Examiner—Andrew V. Kundrat
Attorney, Agent, or Firm—Carl G. Ries; Robert A. Kulason; Henry C. Dearborn

[57] ABSTRACT

A mechanism for use with telescopic tubing to lock an outside and inside tube against longitudinal movement relative to one another. It has an inside stiffener for the inside tube, that is attached to rotate with that tube. And, the stiffener carries an eccentrically mounted element that is wedged into locking contact with the outside tube by rotating the inside tube about its axis, relative to the outside tube.

2 Claims, 2 Drawing Figures

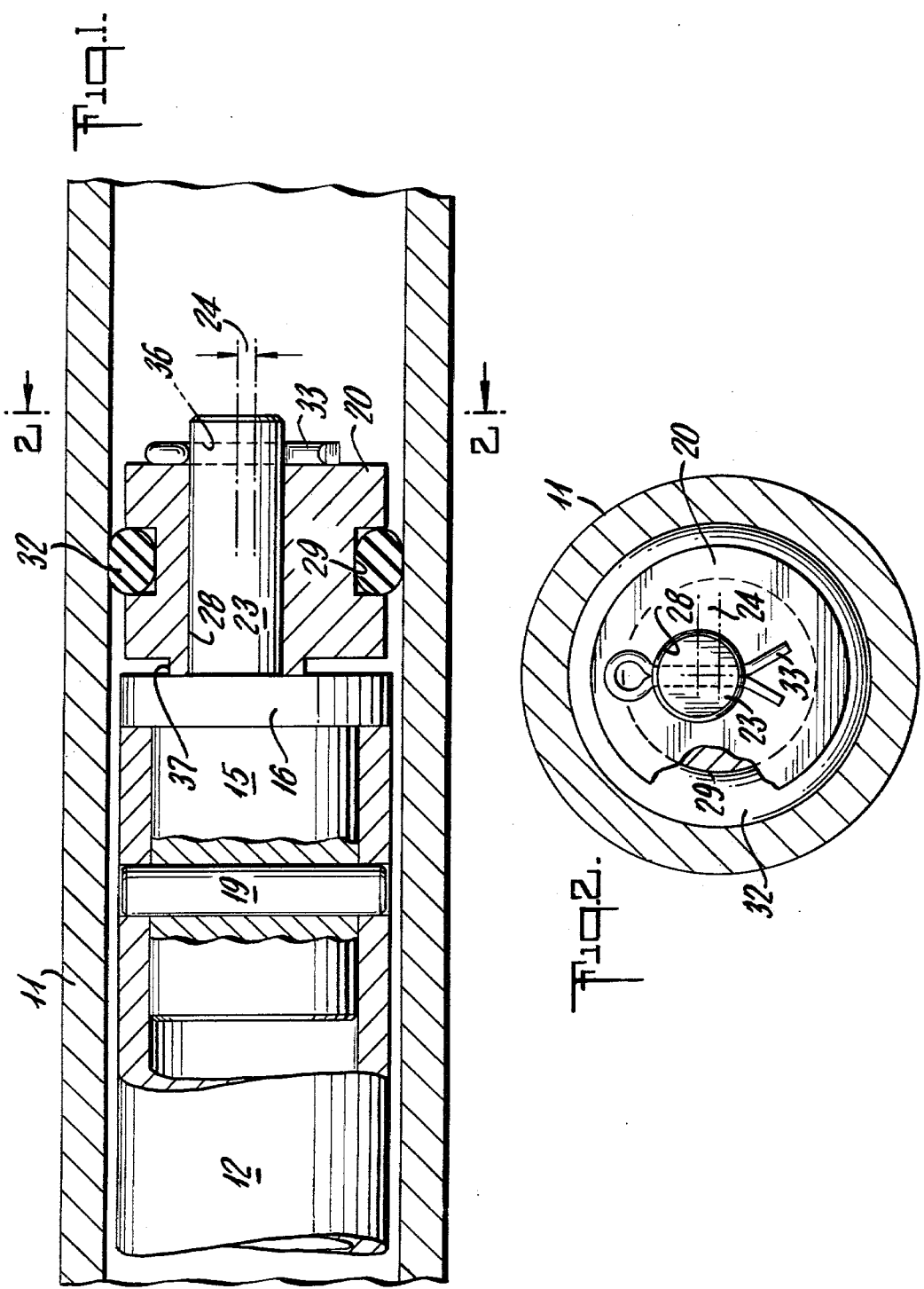

LOCKING MECHANISM FOR TELESCOPIC TUBING

BACKGROUND OF THE INVENTION

1. Field of the Invention

This invention concerns a locking mechanism for use with telescopic tubing.

2. Description of the Prior Art

While the general concept of making use of eccentricity in connection with telescopic tubing (for maintaining a particular longitudinally adjusted position) is quite old as disclosed in a U.S. Pat. No. 958,752 to MacKensen, issued May 24, 1910, that arrangement has various drawbacks. A more recent suggestion for making a locking structure with telescoping tubes, is disclosed in the U.S. Pat. No. 2,261,505 (Schlesinger, Nov. 4, 1941). However, it is obvious that the structure there employed has considerable complexity and would be relatively expensive to manufacture.

Thus, it is an object of this invention to provide a simple yet highly effective locking mechanism for use with telescopic tubing.

SUMMARY OF THE INVENTION

Briefly, the invention concerns a locking mechanism for use with telescopic tubing having an outside tube and an inside tube. The mechanism comprises concentric means for providing radial support to the inside of said inside telescopic tube, and means for attaching said concentric means to said inside tube for rotation therewith. It also comprises cylindrical means having an outside diameter less than the inside diameter of said outside telescopic tube, and eccentric means for attaching said cylindrical means to said concentric means in order to cause a wedging action to lock said tubes together upon rotation of said inside tube relative to said outside tube.

Again briefly, the invention concerns locking mechanism for use with telescopic tubing having an outside tube and an inside tube. It comprises a concentric plug for providing radial support to the inside of said inside telescopic tube, and a transverse pin through said plug and tube for attaching said plug to said inside tube for rotation therewith. It also comprises a short cylinder having an outside diameter about the same as the outside diameter of the inside tube, and a short shaft integrally attached to said plug. The said shaft is located with the axis thereof parallel to but offset from the axis of said plug. It also comprises a hole through said short cylinder for receiving said shaft, the said hole has the axis thereof parallel to said short cylinder axis but offset the same amount therefrom as said shaft offset. It also comprises a peripheral groove on the outside surface of said short cylinder, and an O-ring in said groove for providing a resilient surface when contacting the inside of said outside tube during wedging action to lock said tubes together upon rotation of said inside tube relative to said outside tube.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a partially cross-sectional assembly of the locking mechanism according to the invention, as used with telescopic tubing, and FIG. 2 is a transverse cross-section view taken along the lines 2—2 and looking in the direction of the arrows.

DESCRIPTION OF THE PREFERRED EMBODIMENT

A prior known locking mechanism for use with telescopic tubing has made use of eccentricity effects for creating the locked condition. However, the structures employed by that mechanism applied pressures on the inner tube of a telescoping pair without providing any inner support for the inner tube. Also, other drawbacks are evident in the old concept disclosed in the above mentioned U.S. Pat. No. 958,752.

With reference to the figures of the drawings, it will be observed that the locking mechanism according to this invention is employed in connection with telescopic tubing. Thus there is an outside tube 11 which acts in conjunction with an inside tube 12 so as to obtain the familiar telescopic action for shortening or lengthening the combined tubes. There is a concentric plug 15 that has a collar 16. Plug 15 fits snugly in the end of the inside tube 12. The plug 15 is held in place for rotation with the inside tube 12 at all times, by means of a transverse pin 19 that extends through, and is flush with the outside surface of the tube 12.

The locking mechanism includes a short cylinder 20 that has an outside diameter about the same as the outside diameter of the inside tube 12. The cylinder 20 is mounted on, for rotation about a short shaft 23. However, it will be noted that the shaft 23 which is integrally attached to the plug 15, is mounted with its axis offset from the axis of the plug and inside tube 12. Such offset is indicated by a reference numeral 24 in FIG. 1. This indicates the distance between the center lines of the short shaft 23 and the plug 15.

There is a hole 28 through the cylinder 20 that receives the short shaft 23 therethrough. It will be understood that the axis of the hole 28 has the same offset from the center line of the cylinder 20 as the short shaft 23 has from the center line of the plug 15. And, of course, the centerline or axis of the plug 15 is concentric with the cylinder 20 so long as they are in the positions illustrated in the drawings.

There is a peripheral groove 29 that is centrally located on the outside surface of the short cylinder 20. This groove 29 acts to contain an O-ring 32 which provides a resilient surface when the mechanism is activated to lock the outer and inner tubes together.

It will be appreciated that there may be any feasible arrangement for restraining the short cylinder 20 against axial sliding off of the shaft 23. As indicated in the drawings, this may be done by use of a cotter pin 33 that goes through a transverse hole 36 near the end of the shaft 23. Also, there is an anti-friction shoulder 37 on the other face of the cylinder 20.

OPERATION

It will be understood that when the parts are in the relative positions illustrated in the drawings, the telescoping action (by longitudinal relative sliding movement) between the inner tube 12 and the outer tube 11 may take place freely. Then, at any given position when it is desired to lock the elements (i.e. tubes 11 and 12) together against any sliding longitudinal movement, the inner tube 12 will be rotated on its axis and relative to the outer tube 11. The rotation may be in either direction. And, because of the eccentric positioning of the elements (i.e. the offset 24 between the axis of the inner tube 12 and the axis of the short shaft 23) the rotation will cause a wedging action to take place between the short cylinder 20 and the inside of the outer tube 11. Also, since there will be some limited rotational movement of the short cylinder 20 about the shaft 23 as the locking rotation takes place, the wedging action will be smooth and will make a positive locking action.

It will be appreciated that there are many uses for telescoping tubings where locking structure according to this invention is employed. It provides easy yet secure locking at a given point with easy release for change in that position, as desired.

While a particular embodiment of the invention in accordance with the applicable statutes has been described above in considerable detail, this is not to be taken as in any way limiting the invention but merely as being descriptive thereof.

I claim:

1. Locking mechanism for use with telescopic tubing having an outside tube and an inside tube, comprising
    concentric means for providing radial support to the inside of said inside telescopic tube,
    means for attaching said concentric means to said inside tube for rotation therewith,
    cylindrical means having an outside diameter less than the inside diameter of said outside telescopic tube and including a peripheral groove thereon, with an O-ring in said groove, and
    eccentric means for attaching said cylindrical means to said concentric means, comprising
        a shaft integrally attached to said concentric means for rotatably supporting said cylindrical means,
        said shaft being located with the axis thereof parallel to but offset from the axis of said concentric means, and
        a hole through said cylindrical means for receiving said shaft,
        said hole having the axis thereof offset from the axis of said cylindrical means the same amount as said shaft axis offset, and
    a reduced cylindrical portion on one end of said cylindrical means providing an anti-friction shoulder for engagement with said concentric means.

2. Locking mechanism for use with telescopic tubing having an outside tube and an inside tube, comprising
    a concentric plug for providing radial support to the inside of said inside telescopic tube,
    a transverse pin through said plug and tube for attaching said plug to said inside tube for rotation therewith,
    a short cylinder having an outside diameter about the same as the outside diameter of said inside tube,
    a short shaft integrally attached to said plug,
    said shaft being located with the axis thereof parallel to but offset from the axis of said plug,
    a hole through said short cylinder for receiving said shaft,
    said hole having the axis thereof parallel to said short cylinder axis but offset the same amount therefrom as said shaft offset,
    a peripheral groove on the outside surface of said short cylinder, and
    an O-ring in said groove for providing a resilient surface when contacting the inside of said outside tube during wedging action to lock said tubes together upon rotation of said inside tube relative to said outside tube, and
    a reduced cylindrical portion on one end of said short cylinder providing an anti-friction shoulder for engagement with said concentric plug.

* * * * *